United States Patent
Pütz et al.

(10) Patent No.: US 12,508,896 B2
(45) Date of Patent: Dec. 30, 2025

(54) AIR GUIDANCE CONTROL UNIT FOR A MOTOR VEHICLE

(71) Applicant: Montaplast GmbH, Morsbach (DE)

(72) Inventors: Andreas Pütz, Much (DE); Andreas Ewert, Waldbröl (DE); Sebastian Schwegmann, Lohmar (DE); Johannes Müller, Waldbröl (DE); Frank Mika, Nümbrecht (DE)

(73) Assignee: MONTAPLAST GMBH, Morsbach (DE)

( * ) Notice: Subject to any disclaimer, the term of this patent is extended or adjusted under 35 U.S.C. 154(b) by 316 days.

(21) Appl. No.: 18/029,844

(22) PCT Filed: Oct. 4, 2021

(86) PCT No.: PCT/EP2021/077287
§ 371 (c)(1),
(2) Date: Mar. 31, 2023

(87) PCT Pub. No.: WO2022/069765
PCT Pub. Date: Apr. 7, 2022

(65) Prior Publication Data
US 2023/0406092 A1 Dec. 21, 2023

(30) Foreign Application Priority Data
Oct. 2, 2020 (DE) ..................... 10 2020 125 917.4

(51) Int. Cl.
*B60K 11/08* (2006.01)
(52) U.S. Cl.
CPC ................. *B60K 11/085* (2013.01)

(58) Field of Classification Search
CPC ................. B60K 11/085; F01P 7/10
(Continued)

(56) References Cited

U.S. PATENT DOCUMENTS

| 6,390,217 B1 * | 5/2002 | O'Brien | ................. B60K 11/04 160/DIG. 1 |
| 7,927,684 B2 * | 4/2011 | Comeaux | ................. B32B 25/20 442/99 |

(Continued)

FOREIGN PATENT DOCUMENTS

| DE | 202011050032 U1 | 7/2011 |
| DE | 102017211577 A1 | 1/2019 |

(Continued)

OTHER PUBLICATIONS

Int'l Search Report and Written Opinion mailed Mar. 28, 2022 in Int'l Application No. PCT/EP2021/077287.

*Primary Examiner* — Hau V Phan
(74) *Attorney, Agent, or Firm* — Panitch Schwarze Belisario & Nadel LLP

(57) ABSTRACT

Air flow control insertable into an air opening for controlling air flowing along an air flow direction, with a closure device including a cloth or fabric adjustable between an opening position releasing the air opening and a closing position at least partially closing the air opening by means of an adjustment device for selectively releasing and closing the air opening to change the air resistance and/or for thermal management of a downstream unit in the air flow direction. Various solutions are proposed to integrate the air control system in or behind an air grille, especially in very limited installation space.

11 Claims, 4 Drawing Sheets

(58) Field of Classification Search
USPC .......................................................... 180/68.1
See application file for complete search history.

(56) References Cited

U.S. PATENT DOCUMENTS

| | | | | |
|---|---|---|---|---|
| 8,627,911 | B2* | 1/2014 | Tregnago | B60K 11/085 |
| | | | | 180/68.1 |
| 9,109,594 | B2* | 8/2015 | Pawlick | F04B 17/06 |
| 9,180,751 | B2* | 11/2015 | Han | B60H 1/00692 |
| 9,365,106 | B2* | 6/2016 | Brückner | B60K 11/085 |
| 10,479,193 | B2* | 11/2019 | Shimizu | B60K 11/04 |
| 2011/0232865 | A1* | 9/2011 | Mildner | F01P 7/10 |
| | | | | 165/96 |
| 2014/0216834 | A1* | 8/2014 | Elliott | B60K 11/085 |
| | | | | 180/68.1 |
| 2017/0334284 | A1* | 11/2017 | Drozdowski | B60R 19/52 |
| 2019/0009667 | A1* | 1/2019 | Steffen | F01P 7/12 |
| 2020/0156461 | A1* | 5/2020 | Droulez | B60K 11/085 |

FOREIGN PATENT DOCUMENTS

| | | | |
|---|---|---|---|
| FR | 2975949 | A1 | 12/2012 |
| GB | 962336 | A | 7/1964 |
| WO | 2018158513 | A1 | 9/2018 |
| WO | 2019197747 | A1 | 10/2019 |

* cited by examiner

AIR GUIDANCE CONTROL UNIT FOR A MOTOR VEHICLE

CROSS-REFERENCE TO RELATED APPLICATIONS

This application is a Section 371 of International Application No PCT/EP2021/077287, filed Oct. 4, 2021, which was published in the German language on Apr. 7, 2022, under International Publication No. WO 2022/069765 A1, which claims priority under 35 U.S.C. § 119 (b) to German Application No. 10 2020 125 917.4, filed Oct. 2, 2020, the disclosures of each of which are incorporated herein by reference.

The invention relates to an air flow control, preferably insertable in a frame, which surrounds at least one air opening for the passage of air flowing along an air flow direction, a closing device, which is adjustable by means of an adjusting device between an open position releasing the air opening and a closed position at least partially closing the air opening, for selectively releasing and closing the air openings for a thermal management of a motor vehicle unit arranged downstream in the air flow direction, in particular a radiator, e.g. a water cooler for an internal combustion engine or a cooler, e.g. for ventilating a brake or battery.

In addition, the invention relates to a motor vehicle arrangement comprising the air flow control at an inlet end of an air line, an air line extending along an air flow direction and a unit around which the air flows, in particular a vehicle radiator, e.g. the water radiator for an internal combustion engine or a radiator for ventilating the brakes or a battery.

All the inventions deal in the broadest sense with a device for the thermal management of a power unit, in particular a device which can be arranged in or behind a frame or a radiator grille of a motor vehicle, preferably at the front end thereof, and wherein, by means of the closure device, the air flow of the airstream through the frame can be regulated in a defined or spanned plane, in that the closure device in or behind the frame can selectively open or close the at least one air opening.

Such an airflow control is sometimes referred to as an "Active Grill Shutter" because it is located at the front end of a motor vehicle behind a grille or radiator grill of a motor vehicle.

The air opening can thus be selectively closed by the closing device depending on the engine power.

The frame thus spans a frame plane which is circumferentially enclosed by the frame and simultaneously defines the air opening. This air opening can be selectively opened and closed by the closing device depending on the power of the unit. Closed is the air guide control e.g. for faster heating e.g. of an engine in the starting phase and opened is the air guide control under full load for better cooling of the engine.

Roller blind systems with a roll-up and roll-down roller blind as well as drivable individual flaps are used as closing devices.

The roller blind is unwound and wound onto a drivable shaft between the open position wound onto the shaft and the unwound closed position. Such a roller blind system is known, for example, from DE 10 2017 211 577 A1. Other roller blind systems are known from U.S. Pat. No. 1,379, 412, DE 10 2018 201 469 A1, DE 10 2019 106 828 A1 and WO 2019/197747 A1.

The flaps comprise several flaps arranged rotatably above or next to one another in the frame with a flap longitudinal axis extending transversely to the direction of travel, each flap being accommodated rotatably in the frame and comprising flap surfaces. The flaps can be rotated from the closed position, in which the flap surfaces extend essentially transversely to the direction of travel, to an open position about their respective flap longitudinal axis, in which the flap surface extends completely or partially parallel to the direction of travel.

Such a flap arrangement is known, for example, from EP 2 855 185 B1.

Disadvantages at the State of the Art

To regulate the air intake, a cover is driven in known roller blind systems, for example by means of a cable, in order to be able to close or release the openings of the frame. The disadvantage here is that the rolling up runs in one direction and thus requires a longer path to release the air supply.

Further disadvantages can be seen in known roller blind systems where the cover is driven, for example, by a cable, in order to close or release the openings of the radiator grille. Cable pulls could be disadvantageous here, since they must run over deflection pulleys and thus wear out faster, can tilt or jump out of the guide and the regulation of the cooling is suspended, thus to enormous damage of the vehicle and/or the engine due to an insufficient cooling can lead. This hinders air conditioning of the vehicle with fresh air.

Task

It is the task of the invention to at least partially avoid the disadvantages of the prior art and, in particular, to provide a cost-effective, reliable and compact air guidance control system.

Invention

The invention solves this problem by the features of the independent claims. Advantageous but not mandatory features are given in the dependent claims.

The invention provides a compact closure system based on the concept of "bellows with sliding technology" for air guidance control in motor vehicles. The closure system is compact and reliably fulfills the function of airflow control with a folding system in a small available installation space.

The invention allows fast opening and closing, and is easily adaptable to compact dimensions so that it can be easily integrated into existing systems in the FFZ, e.g. in a radiator grille, and also comprises few components.

DESCRIPTION OF THE INVENTION

A first solution provides that two drivable spindles are arranged in the frame laterally and spaced apart from each other, at least one of which is drivable, wherein a movement rail extends between the spindles, which is movable through the at least one spindle and to which an upper end of a bellows is attached or provided.

The solution thus proposes linear gears extending in the frame in the installation position, preferably vertically, and between which is arranged a closure element comprising a straight closure rail which engages laterally with the worm gears and is thus adjustable in height for opening and closing the bellows attached to the underside of the closure rail. The bellows has the advantage of being particularly easy to fold in an orderly and determined folding or laying process.

The adjustment spindle is preferably driven by actuator, in particular an electric motor.

Preferably, the lower end of the bellows is attached to a stationary locking rail which can be clamped into and fixed in the frame.

The spindles or the like are thus seated laterally rotatably in the frame and may include a bearing guide.

Preferably, these are clipped in place.

The bellows comprises a locking rail at a lower end, which is designed to be clamped into the frame and is preferably clipped to the frame.

At the upper end, the bellows may include a movement rail extending between the spindles, holding the bellows and including a movement pin cooperating with the spindle and a guide pin engaging a lateral guide groove of the frame.

When the spindle or spindles are rotated, they displace the movement pins running in them and thus open or close the bellows. The bellows can be manufactured as a separate part or together with the movement rail, e.g. by means of 2K technology, e.g. comprising a PET, PE, textile or fiber composite material, which is overmolded with the movement rail or manufactured individually and connected/clipped together.

A bellows in the sense of the invention is to be understood as a woven fabric or cloth which has sufficient inherent stability and which has predefined folds or creases at defined, preferably regular intervals, so that when the bellows is pulled apart or folded together along these folds or creases it folds or unfolds in the manner of an accordion. The folding principle of the bellows, which can be folded into or along folds, thus enables uniform, fast and reliable air control in a confined installation space.

The at least one spindle is driven via an actuator, which is preferably an electric motor and engages, for example, a top square on the at least one spindle. Several spindles can be driven synchronously via an actuator at the same time by means of coupling elements.

In a further development, the spindles and their actuators or drives can also be covered to protect them from dirt and to exclude possible injuries in the event of human intervention.

The first solution thus proposes that the adjusting device comprises spindles arranged laterally of the air openings in the frame or in the air openings themselves and spaced apart from each other, the spindles thus laterally enclosing the air openings, that a movement rail operatively connected to at least one spindle, preferably both spindles, is arranged between the spindles, and that a bellows is attached to the movement rail so that the bellows selectively opens and closes the air opening. Thus, if the spindles forming the adjustment device are rotated by an actuator, the linear drive acting in this way is set in motion and the movement rail is adjusted upwards and downwards or inwards and outwards relative to the longitudinal extension direction of the spindle.

Since the bellows consists of pre-folded material provided with folds, preferably a nonwoven, a fabric or the like, which is in particular media-resistant and may have a coating for this purpose, it folds up in defined fold lines when folded, i.e. when the closure device is opened, so that the bellows is folded up in a very confined space and in a well-structured manner.

In the preferred embodiment, the adjustment device is arranged in a frame which can be inserted in an air opening. Alternatively, the device can also be designed directly in a corresponding opening, e.g. a radiator grille, so that the frame is not absolutely necessary, but represents an advantageous further development. It is also possible to assemble a number of individual frames with corresponding closure devices in a modular fashion to form an overall frame, which can be extended as desired to include further individual frames.

A second embodiment, which is to be regarded separately from the first solution described above, is characterized in that the closure device comprises a spring-loaded winding shaft extending transversely to the air opening, on which the fabric acting as closure device can be wound by spring tension with a first fabric end, in particular a fabric upper end, to which the fabric is thus fastened and which in this respect can also be referred to as fastening end; thus the spring-loaded winding shaft with the fabric wound thereon form a fabric roller blind which rolls up itself by the spring force. Furthermore, the adjusting device comprises an adjusting spindle extending likewise transversely and parallel spaced offset from the spring winding shaft and rotatably mounted in the air opening or the frame with opposing threaded sections at opposite ends. Drivers, preferably designed as nuts, run on the threaded sections and the drivers, preferably designed as nuts, are connected to a free end opposite the fastening end and thus not connected to the spring winding shaft via rotatable connecting arms articulated and preferably guided on the drivers.

When the adjustment spindle is rotated by an actuator, in particular comprising an electric motor, the linear drive is thus set in motion and the rotation of the adjustment spindle causes a movement of the drivers/nuts on the threaded sections designed to run in opposite directions, so that depending on the rotation of the adjustment spindle via the connecting arm, the fabric of the fabric closure is wound onto the spring-loaded winding shaft or, in the case of movements in the opposite direction, is unwound from the spring-loaded winding shaft against the spring tension of the latter.

In principle, it is also within the scope of the invention that the closure device comprises only one spring winding shaft and that the air opening can thus be closed by only one fabric closure, which thus closes the entire air opening in the closed position.

The particularly preferred embodiment, because it is quicker to open and close, is that the adjustment spindle is arranged approximately in the center of the air openings and that one spring-wound shaft with a windable fabric closure is arranged at an equal distance to the outside in the frame or receiving joining partner in relation to the adjustment spindle. This thus reduces the time for opening and closing the overall opening by half, because only half the closure device has to be opened or closed in each case.

This solution is also particularly space-optimized, which means that it can be reinforced in a particularly small space and is very independent of other solutions.

Particularly good and harmonious guidance of the connecting arms engaging the closure fabric to avoid unwanted jamming can be achieved by the connecting arms additionally comprising guides which guide the connecting arms during opening and closing. Preferably, the guide is designed as a preferably arc-shaped link guide, which means that they have a track or recess formed in a guide surface along which a connecting pin rotatably hinged to the fabric roller blind moves.

This link guide preferably comprises at least one arcuate guide section in which the end of the connecting arms connected to the spring winding shaft is movably guided. The arcuate guide section is designed to facilitate movement of the connecting arms from the closed position to the open position and vice versa.

Preferably, each connecting pin, which is rotatably hinged to the fabric roller blind, is guided in a guide.

In the preferred embodiment with the adjustment spindle arranged in the center and fabric roller blinds spaced from it on both sides, the ends of which are each connected to a driver of the adjustment spindle via a connecting arm, the air guide control thus guides four guides for each of the connecting arms rotatably hinged to the ends of the fabric roller blinds.

In a particularly stable embodiment, a stabilizing strip is provided at the proximal end of the fabric closure, by which the fabric closure is held in shape, i.e. stretched across the width of the air opening in such a way that it is wrinkle-free and can thus also be wound harmoniously and easily onto the spring winding shaft.

Preferably, this stabilizing strip is connected to the proximal end of the closure fabric, either by bonding, welding, clipping or also by injection molding, e.g. by producing the closure fabric in a first step and then back-injecting it with the stabilizing strip. In the case of clipping, the stabilizing strip can then comprise two strip parts which are placed on both sides of the proximal end of the closure fabric and can be connected to one another, particularly preferably non-detachably, via pin connectors or a connecting strip projecting through the fabric closure in the installed position.

Preferably, the closure device or, more precisely, its components are made of plastic, and particularly preferably these are designed as plastic injection molded parts. The use of the following plastics has proven to be particularly advantageous: Polyester or TPO (thermoplastic olefins).

The fabric closure can be manufactured particularly cost-effectively by producing it and the molded-on stabilizing bar in a so-called one-shot process, i.e. both parts are produced in one injection molding cycle in one injection molding machine.

The motor vehicle arrangement according to the invention comprises the closure device described above and a unit, in particular designed as a radiator, and possibly also a flow duct for conducting air between an air inlet and an air outlet, which can be arranged, for example, between another component and the unit, and wherein the air inlet is regulated via the closure device.

To simplify assembly, the closure device is preferably arranged in a frame which can be installed with the motor vehicle; however, the closure device can be installed without a frame in a suitably designed air opening, so that the frame is not a mandatory component of the invention.

Preferably, the closure device is located at a front end of the motor vehicle, for example in a radiator grille, and can thus influence the air resistance (CW value) of the vehicle by opening and closing.

A third embodiment, which is again independent of the first and second solutions, is characterized in that the closure device comprises a winding shaft extending transversely to the air opening, on which the fabric is wound with an inner end, that the winding shaft comprises at least one gear wheel, that the adjustment device further comprises at least one rack cooperating with the gear wheel and having a rack inner end and a rack outer end, and that a fabric outer end of the fabric is attached to the rack outer end. This solution can be summarized in a keyword-like manner under the term "sliding-rotating mechanism" with air control. The winding shaft, on which the fabric is wound, does not have to be spring-loaded because of the racks driven by this winding shaft. In the opening position, the fabric is wound onto the winding shaft and the racks are located close to the winding shaft by the toothed wheel(s) with their outer rack ends. If the air opening is now to be closed, the winding shaft is rotated by an actuator, preferably an electric motor, so that the at least one toothed wheel provided on the winding shaft spaces the outer rack ends from the winding shaft and thus displaces the fabric material along the air opening uniformly in both directions and thus closes the air openings on both sides of the winding shaft, which is preferably arranged centrally. In this respect, a very fast and effective closing of the air openings can also be achieved with this solution due to the central arrangement of the alternating falls and the fabric closing devices arranged on both sides.

Particularly clean and good guidance of the racks is achieved when they are guided on corresponding guide sections of the frame or in the radiator grille.

Particularly smooth and stable guidance without jamming of the racks is achieved by the winding shaft comprising two spaced-apart gears arranged on opposite sections of the frame or radiator grille, each of which interacts with racks arranged there.

The following comments concern advantageous embodiments that apply to all proposed solutions.

Stiffening ribs can be incorporated in the frame at right angles to the direction of air flow, i.e. at right angles to a frame surface spanned by the frame. These can also be of any design, e.g. as advertising, supplier logo or specific OEM mark.

The frame and the closure system can either be arranged individually behind radiator grids or be assembled modularly from several closure devices assigned to individual frames to form an overall frame.

The system is thus designed to be modularly expandable, whereby an actuator/drive for the adjustment device can be assigned to each driven shaft, but can also be connected to several shafts via a coupling member.

Preferred embodiments provide for integrated fabric tempering of the respective fabric closure, by which is meant that one or more wires are provided in the fabric, e.g. injected, particularly preferably by means of 2-K technology. By means of these wires or this tempering, an On Board Diagnostic ("OBD2") of the closure device or its failure is thus possible. If the wire is destroyed or its conductivity is changed, which occurs, for example, when the shutter device is destroyed, or if the actuator moves more smoothly or more heavily for actuation, this indicates the presence of a defect or an object inside the air opening, which can then be selectively rectified precisely.

According to the invention, one or more frames with closure devices can be provided, with each closure device preferably being individually controllable for each frame. Alternatively, several closing devices for several frames or several air openings can be controlled simultaneously, e.g. several air openings in a radiator grille via actuator and connected to a coupling member.

The locking devices can be inserted directly into the frame or radiator grille comprising several frames, or can be inserted into them. In this respect, the frame does not necessarily have to be present. Rather, it is sufficient for the closure device comprising flaps to be insertable, preferably snap-in, in a frame.

Embodiments that can be inserted into the frame or an air opening preferably include plate-like side bearings into which the closure devices can be inserted.

Thus, the prefabricated assembly comprising the respective closure device and the side bearings can be easily inserted into the corresponding air opening as required, e.g. into the frame of a radiator grille or the like.

All solutions can either be formed directly in the frame with the at least one, preferably several, air openings, so that one such closure device is arranged in each air opening, whereby several closure devices can also be driven in different air openings via a common actuator.

The fabric of the closure devices for selectively closing the air openings and the other components of the air guidance control system can be manufactured particularly advantageously in one piece, in particular by the 2K injection molding process, the fabric preferably being a fiber composite and the other components, such as the frame, and the shafts being a solid plastic.

Further features and advantages of the present invention will become apparent from the following figure description of preferred embodiments with reference to the accompanying figures.

In this regard, directional terminology such as "top," "bottom," "front," "rear," "front," "rear," etc. is used in reference to the orientation of the figure(s) described. Since components of embodiments may be positioned in a number of different orientations, the directional terminology is for illustrative purposes and is not limiting in any way. It is understood that other embodiments may be used and structural or logical changes may be made without departing from the scope of protection of the present invention.

The following detailed description is not to be taken in a restrictive sense.

In the context of this description, the terms "connected", "connected" as well as "integrated" are used to describe both a direct and an indirect connection, a direct or indirect connection as well as a direct or indirect integration. In the figures, identical or similar elements are given identical reference signs where appropriate. The representations in the figures are essentially to scale. However, in order to illustrate details, certain areas may be shown in an exaggerated size recognizable to those skilled in the art. In addition, the drawings may be strikingly simplified and do not include every detail that may be present in the practical embodiment.

Unless otherwise indicated, the indefinite article and definite article refer not only to a single component, but are to be understood as "at least one". The terminology includes the previously mentioned words, variations thereof, and similar meanings. Further, it should be understood that the terms "about," "substantially," and similar terms in connection with the dimensions and a property of a component of the invention do not describe the described dimension and property as a strict limit or parameter and do not exclude minor variations thereof which are functionally similar. At a minimum, descriptive parts with numerical parameters also include variations of those parameters in accordance with prior art mathematical and manufacturing principles, e.g., rounding, deviations and other systematic errors, manufacturing tolerances, etc.

Finally, in the case of several identical components or elements, for reasons of clarity only one reference sign is given in each case.

All features of the respective embodiments are also disclosed independently of each other in general within the scope of the invention. Identical reference numerals of the figures refer to identical components or features. It shows:

FIG. 1 an isometric front view of the first solution bellows with sliding technology;

FIG. 2 an enlarged side view of the bellows with sliding technology according to FIG. 1;

FIG. 3 an embodiment with two bellows with sliding technology as shown in FIG. 1 arranged next to each other;

FIG. 4 the embodiment according to FIG. 2 in the front view in the open position;

FIG. 5 the embodiment according to FIG. 4 in closed position;

FIG. 6a a front view of the embodiment closure material with spindle drive in the open position;

FIG. 7 the design according to FIG. 6 in the closed position;

FIG. 8 a front view of the third solution sliding rotary mechanism in the open position;

FIG. 9 a rear view of the third solution from behind in the closed position;

FIG. 10 an arrangement with the central plastic shaft and the fabric material in the closed position; and FIG. 11 a top and bottom view of the racks connected to the center plastic shaft FIGS. 1 to 5 show the first embodiment of bellows with sliding technology, essentially comprising an angular, box-like frame 2, which can be inserted into an air opening of a radiator grille or itself forms the air openings 4 and in which spindles 6, 8 with trapezoidal threads are rotatably accommodated on both sides laterally of the centrally defined air opening 4, which spindles can be driven by a corresponding actuator via quadrilaterals 6a, 8a formed at the upper end. Between the two spindles and 6, 8 extends a rod-like movement rail 10, to which is laterally guided in the trapezoidal thread of the spindle 6, 8 and to the lower end of which is attached a bellows 12 prefabricated with folds. As can be seen from the side view according to FIG. 2, central webs projecting laterally from the movement rail 10 are provided, which are guided laterally in the frame 2. At the lower end, the bellows is clamped in a locking rail 16 which also extends transversely between the two spindles 6, 8 and which thus forces it down.

Figure 1:
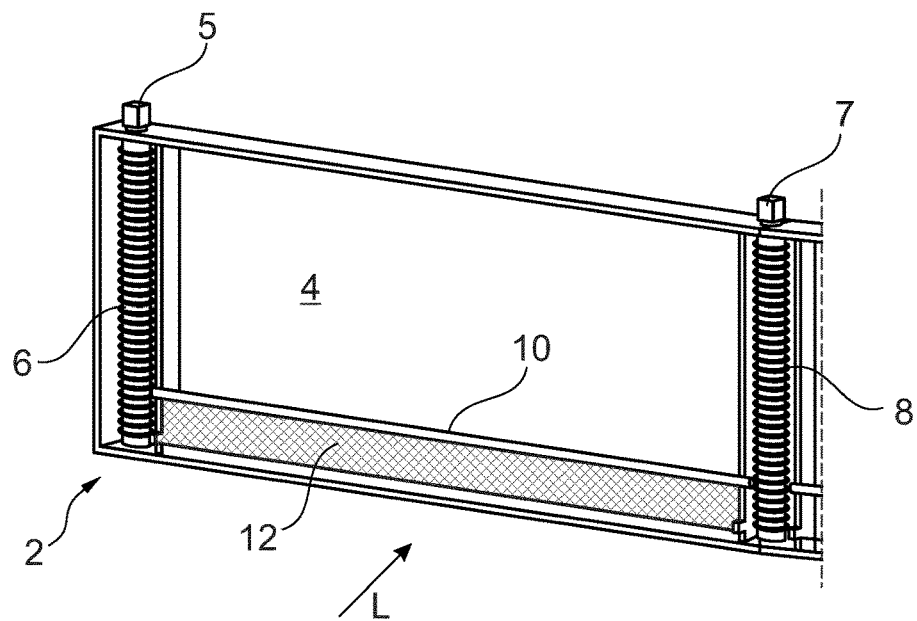
Figure 2:
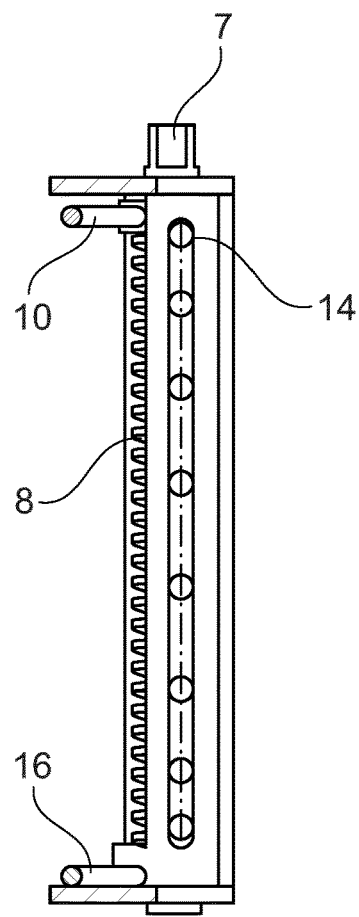
Figure 3:
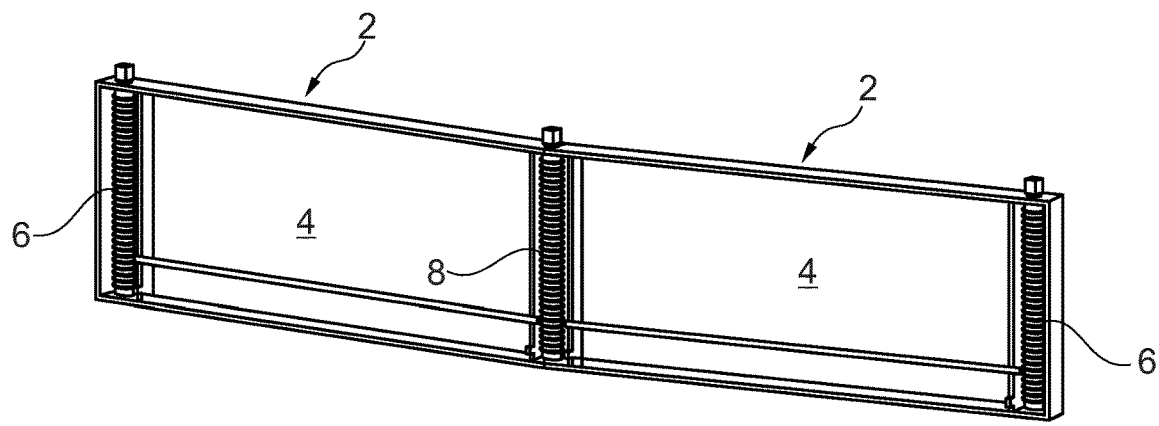
FIG. 3 shows a frame assembly composed of two such frames, which thus comprises two air openings 4 that can be selectively closed by means of corresponding closing devices.
Figure 4:
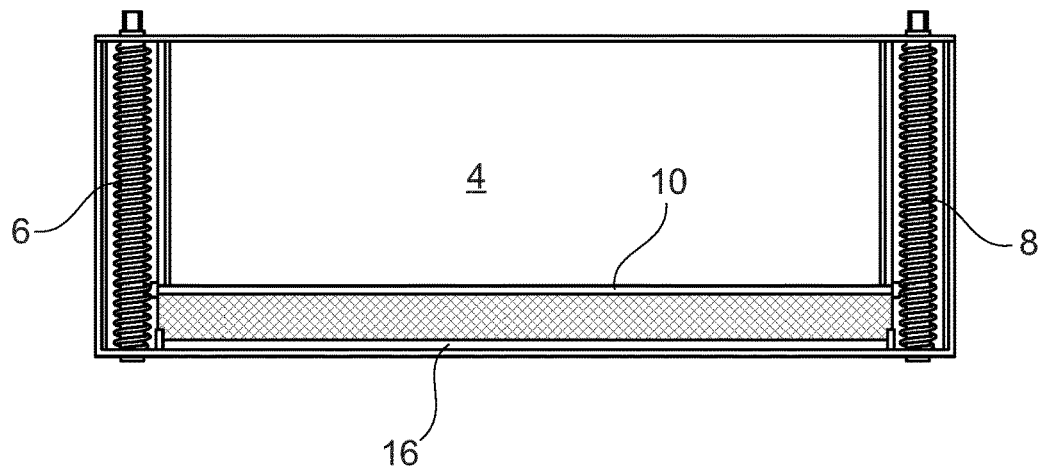
Figure 5:
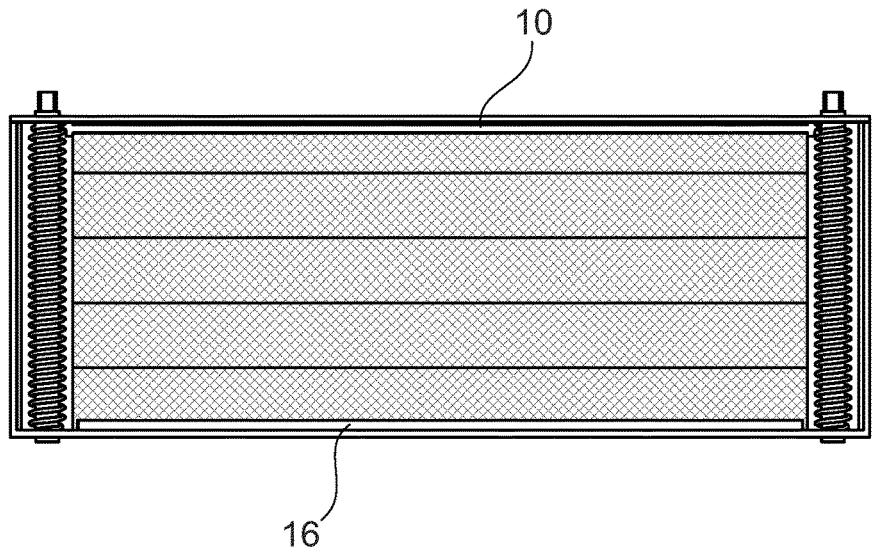

This embodiment may also include a frame 20 that encloses and defines an air opening enclosed therein.

The frame 20 is formed by two vertical webs 20D, 20E spaced from each other by three horizontal webs 20A, 20B, 20C. An adjustment spindle 24 is rotatably mounted centrally in the region of the central horizontal web 20B, which spindle thus extends horizontally in the present case and has two oppositely directed threaded sections 24A and 24B at its outer ends. A pin 24C is provided at the outer end, in which an actuator, preferably designed as an electric motor, can engage for adjusting the adjusting spindle 24.

On the threaded sections 24A, 24B of the adjustment spindle 24 run drivers designed as nuts 26, 28, which engage via connecting arms 30, 32, 34, 36 rotatably hinged at both ends on the lower end of fabric roller blinds 40, 42 arranged parallel to the adjustment spindle 24 on the outer edge of the frame 42.

Figure 6:
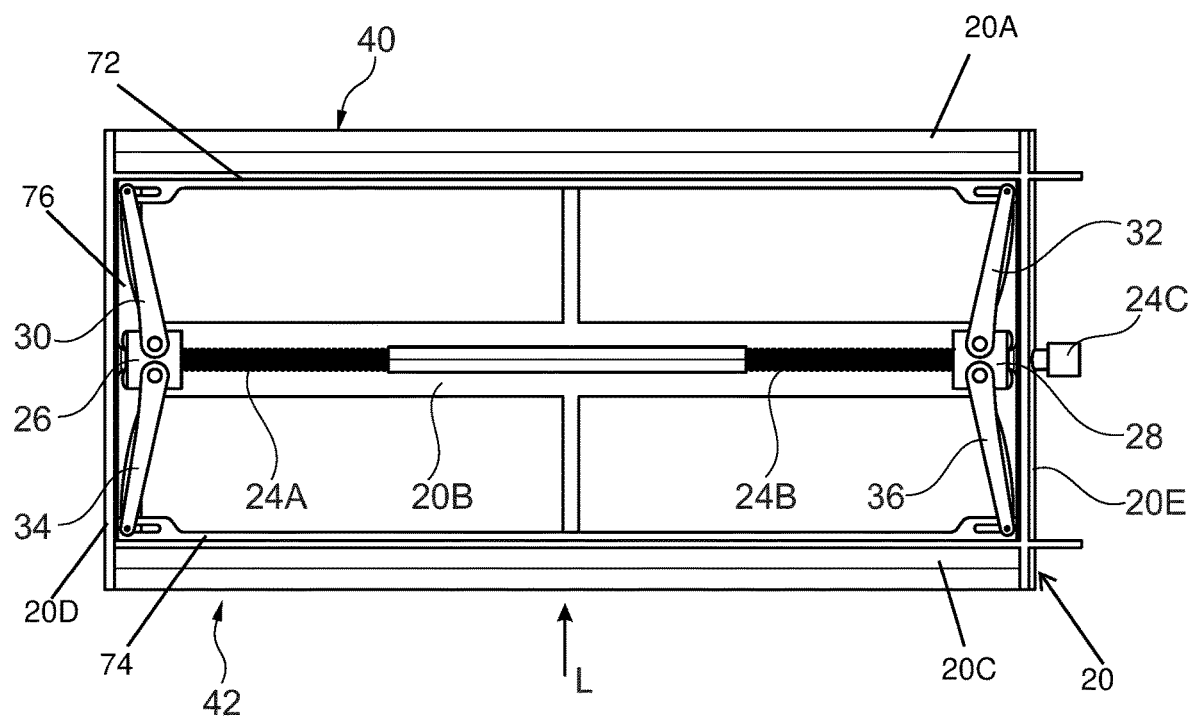
FIGS. 6 and 7 show views of the second embodiment closure material (fabric closure) with spindle drive.

The fabric roller blinds 40, 42 each comprise a spring winding shaft extending parallel to the adjustment spindle 24 and not visible, i.e. a spring-biased shaft on which a fabric web 44, 46 can be wound or is wound in the open position shown in FIG. 6 by the spring force of the spring winding shaft.

Figure 7:
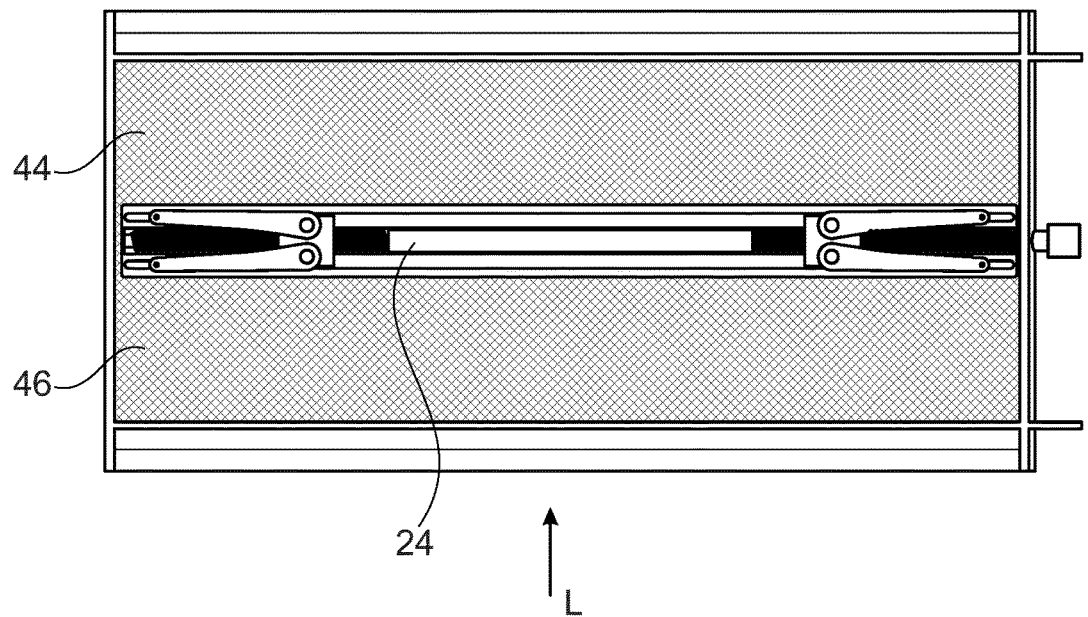
Figure 8:
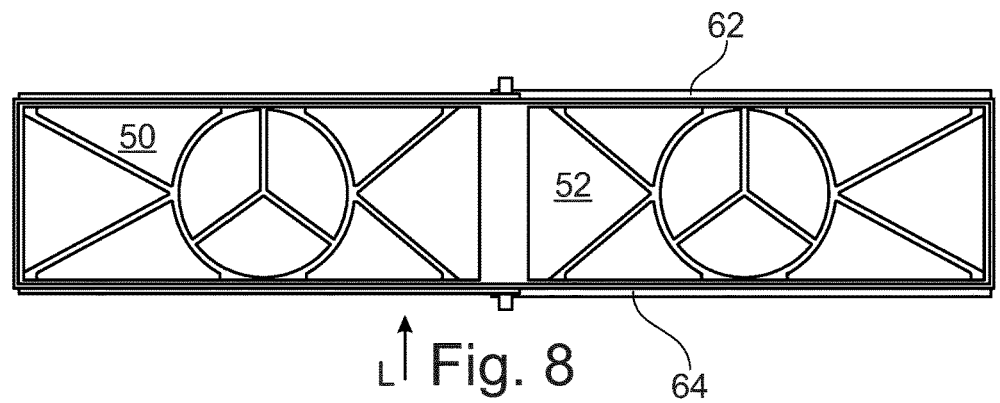
Figure 9:
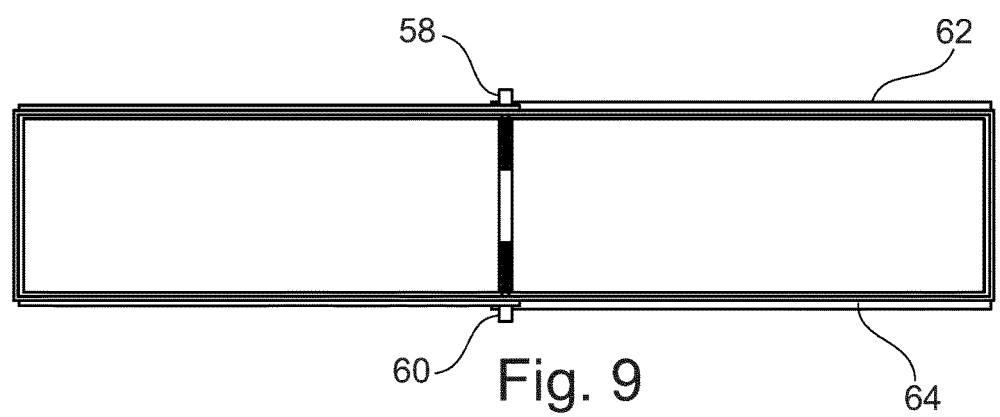
Figure 10:
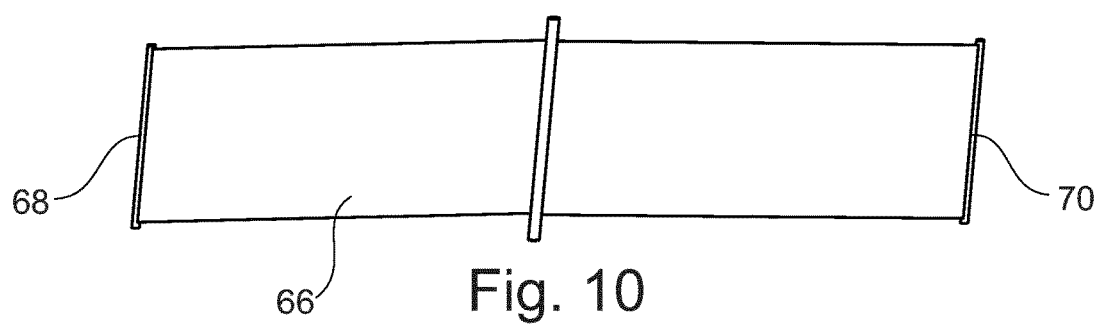
Figure 11:
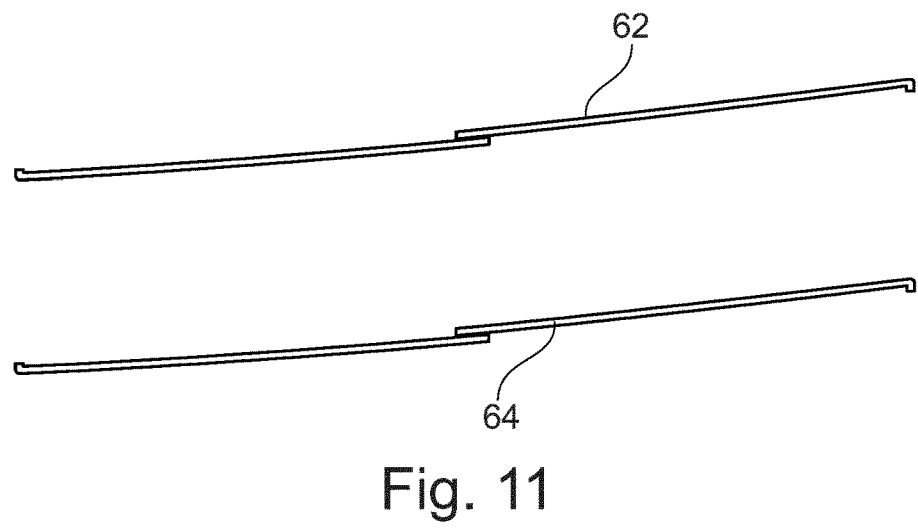

Only by the inward movement of the nuts 26, 28 according to FIG. 7, the connecting arms 30, 32, 34, 36 in arc-shaped lateral guides 76 pull the fabric panels 44, 46 into the closed position shown in FIG. 7. The lateral guides 76 can have arcuate guide tracks in which connecting pins are guided that are rotatably hinged to the fabric roller blinds 40, 42.

To protect the fabric of the fabric roller blinds 40, 42, the spring winding shafts may be covered by housing hoods, which may also be part of the frame 20.

The fabric webs 44, 46 can have stabilizing strips 72, 74 at the free end facing the adjustment spindle 24, which bring the fabric roller blinds 40, 42 into shape and hold them in place, i.e. tension the fabric roller blinds.

Although the embodiment here is the horizontal arrangement, i.e. with the adjustment spindle 24 extending horizontally, this can also be designed in the vertical arrangement, in which the adjustment spindle thus extends essentially vertically in the installation position.

FIGS. 8 to 11 show the third embodiment of a sliding rotary mechanism comprising a frame 54 which again encloses two air openings 50, 52 and in which a drivable winding shaft 56 extends centrally. Toothed wheels 58, 60 are provided at the lower and upper ends of the winding shaft 56, which cog racks 62, 64 resting on the upper and lower sides of the frame 54. Thus, by rotating the winding shaft 56 by means of an actuator, a fiber composite 66 having inner sides attached to the winding shaft 56 and having rods 68, 70 provided on its outer edge is wound onto the winding shaft 56, the rods 68, 70 being connected to the hook-like ends of the rack 62, 64.

Rotation of the winding shaft 56 thus moves the racks 62, 64 inward and outward on the frame 54, opening and closing as the air openings 50, 52 within the frame 54.

LIST OF REFERENCE SIGNS

2 Frame
3 Air opening
6, 8 Spindle
7 Square
10 Movement rail
12 Folding bellows
14 Middle bar
16 Fixing rail
20 Frame
20A, 20B, 20C Horizontal bar
20D, 20E Vertical bar
22 Air openings
24 V Adjusting spindle
24A, 24B Threaded section
24C Pin
26, 28 Mother
30, 32, 34, 36 Connecting arm
40, 42 Fabric blind
42 Frame
50, 52 Air openings
54 Frame
56 Winding shaft
58, 60 Gear wheel
62, 64 Racks
66 Fiber composite
68, 70 Plastic rod
72, 74 Stabilizing bar
76 Leadership

The invention claimed is:

1. An air flow control for a vehicle comprising a frame surrounding an air opening for air flowing therethrough along an air flow direction, a closure device comprising a fabric or a tissue, which is adjustable by an adjustment device between an open position releasing the air opening and a closed position at least partially closing the air opening for selectively releasing and closing the air opening, the closure device comprising a self-winding fabric roller blind with a spring winding shaft extending transversely to the air opening and spring-biased on which the fabric is windable with a first fabric end, the adjusting device comprising a rotatably mounted adjusting spindle (24) extending also transversely and parallel offset to the spring winding shaft and having counter-rotating threaded portions at opposite ends, corresponding drivers running on the threaded portions, and the drivers being connected to a second fabric end of the fabric roller blind via connecting arms rotatably articulated to said drivers.

2. The air flow control for the vehicle according to claim 1, comprising two spring winding shafts each located at an outer end of the frame, the adjustment spindle being located in a center of the air opening, and wherein one fabric blind each is located at an equal distance from the centered adjustment spindle.

3. The air flow control or the vehicle according to claim 1 comprising guides for the connecting arms.

4. The air flow control for the vehicle according to claim 3, wherein the guides are formed as link motion channel guides.

5. The air flow control for the vehicle according to claim 1, wherein the drivers comprise nuts.

6. The air flow control for the vehicle according to claim 1, wherein the fabric has a stabilizing bar at a free end facing the adjustment spindle.

7. The air flow control for the vehicle according to claim 6, wherein the fabric and the stabilizing bar are formed as plastic injection moldings.

8. The air flow control for the vehicle of claim 7, wherein the fabric and the stabilizing bar are produced in one injection molding cycle.

9. The air flow control for the vehicle according to claim 1, wherein a plurality of individual frames with closure devices associated therewith can be assembled in a module-like manner to form an overall frame.

10. The air flow control for the vehicle, according to claim 1, further comprising an air guide control.

11. The air flow control for the vehicle according to claim 1, further comprising at least one air flow control.

* * * * *